United States Patent Office 3,236,660
Patented Feb. 22, 1966

3,236,660
COLOR FOR DUPLICATING INKS
Walter Gustav Drautz, Delmar, and Roger L. Rounds and Albert E. Herrmann, Jr., East Greenbush, N.Y., assignors to General Aniline & Film Corporation, New York, N.Y., a corporation of Delaware
No Drawing. Filed Dec. 9, 1960, Ser. No. 74,763
11 Claims. (Cl. 106—23)

This invention relates to duplicating inks for use in pressure sensitive transfer compositions suitable for production of master copies for spirit hectograph duplication. Duplicating inks for the aforesaid purpose conventionally contain a spirit-soluble dyestuff incorporated in a vehicle of oily to wax-like nature, adapted to form a pressure releasable transfer coating on a carbon paper base or on a paper typewriter ribbon base, or to serve as an impregnant for fabric typewriter ribbons.

The image produced by typing or printing with such a transfer medium on a master sheet yields a portion of the dyestuff contained therein to form a corresponding print on copy sheets when the latter are pre-moistened with a solvent for the spirit-soluble (dyestuff (e.g. alcohol) and are successively pressed into contact with the image-bearing master sheet.

It has been proposed heretofore to make duplicating inks of the aforesaid type using, as the coloring agent, a mixture of water-soluble basic dyestuffs produced by joint crystallization from aqueous solution. Another proposal involved use of a mixture of certain basic dyestuffs which combine to form a product of reduced solubility in water and increased solubility in alcohol. However, mixtures of dyestuffs, when employed in duplicating inks of the aforesaid type, tend to produce non-uniform results by reason of the fact that one dye component of the composition usually exhausts more rapidly during the copying process. As a result, the copies produced initially with a fresh master vary in color from those produced at the end of the series with the same master. On the other hand, a desired shade or color is more readily obtained with a mixture of dyestuffs.

It is an object of this invention to provide dyestuff compositions containing two or more dyestuffs, for incorporation in duplicating inks for hectograph purposes, and to provide inks containing said compositions, which resist differential exhaust of the component dyestuffs, and yield copies of uniform shade from the beginning to the end of the run with a single master sheet. In this connection, it is also an object to produce dyestuff compositions of the aforesaid type which yield copies of essentially pure black shade. It is also an object of this invention to provide duplicating inks of the aforesaid type which are relatively insensitive to water, and hence resistent to smudging by contact with water-moistened objects. Still another object is to provide pressure-sensitive transfer sheets or strips, bearing or containing said duplicating inks as a coating or an impregnant.

These objects are accomplished in accordance with our invention by combining of one or more acid dyestuffs in aqueous solution, with one or more water-soluble basic dyestuffs also in aqueous solution, the acid and basic dyestuff components being in approximately stoichiometrically equivalent amounts. Co-precipitation occurs yielding an amorphous apparently salt-like combination of the acid and basic dye components. The precipitate is separated from the aqueous solution, and after drying is incorporated in a duplicating ink vehicle of oily to wax-line nature.

By employing a combination of more than one acid dyestuff and/or a combination of more than one basic dyestuff, the shade of the precipitate, composed of approximately stoichiometrically combined amounts of acid and basic dye can be readily controlled so as to achieve any desired shade. In particular, various shades of stoichiometrically equivalent amounts of acid and basic dyestuffs can be prepared which yield, when used in hectograph duplicating inks, copies having a pure black coloration.

Water-soluble acid dyes which can be employed in preparing the dyestuff compositions of the invention may be of the azo, triphenylmethane, quinoline, xanthene, azine, anthraquinone or other series, including the following which are identified by name, type and "Colour Index"[1] number:

| Dyestuff | Type | Colour Index No. |
|---|---|---|
| Naphthylamine Black 10BR | Azo | 20470 |
| Orange II | do | 15510 |
| Fast Light Yellow 3G | do | 18820 |
| Palatine Orange GENA | Metallized Azo | 18745 |
| Carmoisine BA | Azo | 14720 |
| Azo Phloxine GA | do | 16540 |
| Supramine Bordeaux BA | do | 17060 |
| Brilliant Crocein 3BA | do | 27290 |
| Supramine Blue RNT | do | 17055 |
| Brilliant Indocyanine 6BA | Triphenylmethane | 42660 |
| Formyl Violet S4B | do | 42650 |
| Guinea Green BA | do | 42085 |
| Violamine RD | Rhodamine | 45190 |
| Induline 2B | Induline | 50405 |
| Brilliant Pure Yellow 6GS | Quinoline | 47035 |
| Alizarine Fast Gray BLN new | Anthraquinone | 65005 |
| Wool Fast Blue BLA | Azine | 50320 |

Water-soluble basic dyes which may be used according to the invention can be, for example, of the triphenylmethane, azo, azine, ketonimine series and the like, and include the following:

| Dyestuff | Type | Colour Index No. |
|---|---|---|
| Victoria Pure Blue BGO | Triphenylmethane | 42595 |
| Rhoduline Blue 6GA | do | 42025 |
| Crystal Violet | do | 42555 |
| Victoria Blue BS | do | 44045 |
| Magenta ABN | do | 42520 |
| Safranine Y | Azine | 50240 |
| Auramine OS | Ketonimine | 41000 |
| Chrysoidine Y | Azo | 11270 |
| Chrysoidine RS | do | 11320 |
| Brilliant Green | Triphenylmethane | 42040 |
| Bismarck Brown B | Azo | 21000 |

In combining acid and basic dyes according to the invention, the acid and basic dyes are dissolved separately in water, and the solutions, containing approximately stoichiometrically equivalent amounts of the acid and basic dyes respectively are combined, preferably at elevated temperature, as from 80 to 100° C. The resulting precipitate is separated from the solution (e.g. by filtration) and dried. The precipitate produced contains approximately equivalent amounts of the acid and basic dye components, although the proportions of one or the other may exceed an equivalent amount by as much as 5%.

Our invention will be more fully understood from the following examples wherein parts and percentages are by weight unless otherwise indicated. The quantities of the dyestuffs indicated in the examples correspond to substantially equivalent amounts of acid and basic components, taking into consideration the molecular weights of the dyestuffs and the strengths of the dyestuff compositions employed.

*Example 1*

10 parts of Victoria Pure Blue BGO are dissolved in 500 parts of water, and the solution heated to 85–95° C. 7.4 parts of Naphthylamine Black 10BR are similarly dis-

[1] 2nd edition, 1956.

solved in 400 parts of water, and the two solutions are mixed by stirring within the aforesaid temperature range. A precipitate forms readily and after stirring and cooling, it is separated by filtration and dried. The resulting pigment yields spirit hectograph duplicating ink compositions having non-smudge properties, and yielding a long life master which produces copies of uniformly blue shade.

*Example 2*

14.5 parts of Chrysoidine Y are dissolved in 500 parts of water at 85–95° C. and 29 parts of Crystal Violet are dissolved in 700 parts of water at the same temperature. 56.5 parts of Naphthylamine Black 10BR are dissolved in 3,000 parts of water, heated to 85–95° C., and the three solutions are combined with stirring within the aforesaid temperature range. After cooling, the resulting precipitate is recovered by filtration and dried. The pigment, thus obtained, yields spirit hectograph duplicating ink having non-smudge properties, and yields a long life master, producing uniformly black copies throughout the duplicating process.

*Example 3*

The proportions in the foregoing example are modified by employing 19 parts of Chrysoidine Y, 26 parts of Crystal Violet and 55 parts of Naphthylamine Black 10BR. The resulting precipitated pigment likewise yields hectograph compositions having non-smudge properties, long life and yielding uniformly black copies.

*Example 4*

51 parts of Chrysoidine Y, 27 parts of Crystal Violet, 20.5 parts of Victoria Blue BS and 1.5 parts of Magenta ABN are dissolved in 3,000 parts of water, heated to 85–95° C. 56.5 parts of Naphthylamine Black 10BR and 55 parts of Formyl Violet S4B are similarly dissolved in 3,000 parts of water, heated to 85–95° C. The two solutions are combined at the aforesaid temperature, and after stirring and cooling, the resulting precipitate is filtered out and dried. The pigment thus obtained is excellent for use in hectograph duplicating inks, and also yield a non-smudge, long life pigment producing copies of uniformly black shade.

*Example 5*

10 parts of Victoria Pure Blue BGO are dissolved in 500 parts of water heated to 85–95° C., and mixed with a solution of 11.5 parts of Formyl Violet S4B in a similar amount of water likewise heated to 85–95° C. The resulting precipitated pigment when filtered, dried, and incorporated in an oily to wax-like vehicle, yields a hectograph duplicating ink having non-smudge qualities, long-life and producing copies of uniformly violet shade. Similar results are obtained upon substituting 10 parts of Victoria Blue BS for the Victoria Pure Blue BGO of the foregoing composition.

*Example 6*

28.4 parts of Victoria Pure Blue BGO and 14.2 parts of Magenta ABN are dissolved in 1,500 parts of water at 85–95° C. 31.2 parts of Formyl Violet S4B and 26.2 parts of Guinea Green BA are dissolved in 1,500 parts of water at the aforesaid temperature. The two solutions are mixed together, stirred, cooled and filtered, and the precipitate thereby separated is dried. This pigment yields hectograph duplicating inks having non-smudge long life qualities, and yielding violet hectograph copies. A similar pigment is obtaned upon substituting 28.4 parts of Victoria Blue BS for Victoria Pure Blue BGO in the foregoing procedure.

*Example 7*

10 parts of Victoria Pure Blue BGO are dissolved in 300 parts of water at 85–95° C., and 11 parts of Guinea Green BA are dissolved in 300 parts of water within the same temperature range. The two solutions are mixed, stirred, cooled and filtered and the filter cake dried. The resulting pigment yields blue-green colorations in hectograph duplicating inks which are non-smudging and produce long life master images. Similar results are obtained upon substituting 10 parts of Victoria Blue BS for Victoria Pure Blue BGO in the foregoing procedure.

*Example 8*

1 part of Safranine Y is dissolved in 100 parts of water at 85–95° C. and 0.6 part of Brilliant Croceine 3BA is dissolved in 60 parts of water within the aforesaid temperature range. On mixing the two solutions, stirring, cooling and filtering, a precipitated pigment is obtained which, when dried, yields hectograph transfer inks producing brilliant red images having the advantages noted in the preceding examples.

*Example 9*

1 part of Auramine OS is dissolved in 100 parts of water at 85–95° C. and 1.5 parts of Brilliant Pure Yellow 6GS is dissolved in 150 parts of water at the aforesaid temperature. The solutions are combined, stirred, cooled and the resulting precipitate filtered and dried. The recovered pigment yields hectograph duplicating inks producing brilliant yellow shades when employed in the hectograph process.

*Example 10*

20 parts of Victoria Pure Blue BGO are dissolved in 1,000 parts water at 85–95° C., and another solution is prepared by dissolving 11.5 parts of Formyl Violet S4B and 11 parts of Guinea Green BA in 800 parts of water at a similar temperature. The two solutions are combined, stirred, cooled, filtered and the precipitate separated and dried. The pigment thereby obtained yields excellent non-smudge hectograph duplicating inks which produces long life master images and copies of bright bluish violet shade.

*Example 11*

A vehicle for a hectograph duplicating ink is prepared by combining, at a temperature of 70–100° C.,

| | Parts |
|---|---|
| Sugarcane wax | 23 |
| Beeswax | 5 |
| Castor oil | 18 |
| Lanoline | 24 |
| Mineral oil | 30 |

The temperature is adjusted to 80–85° C., and 5 parts of the pigment produced in Example 1 are thoroughly mixed at this temperature on a roller mill with 5 parts of the aforesaid vehicle. The resulting ink is coated at the same temperature on a carbon paper base, and the coating is allowed to cool. The resulting coating does not smudge and a hectograph master produced in a typewriter using the resulting sheet as a carbon yields a series of 150 copies in the spirit hectograph process, wherein the image remains black and clear from the beginning to the end of the series. Similarly advantageous results are obtained upon substituting the pigments of Examples 2 to 10 for the pigment of Example 1 in this example.

An alternative vehicle suitable for use as disclosed in Example 11 to produce hectograph transfer sheets and paper typewriter ribbons, can be made by heating a mixture of 11 parts of carnauba wax and 31.0 parts of mineral oil at 80–85° C. Pigments prepared as described, in accordance with the invention, are incorporated in the molten vehicle on a roller mill. In order to prepare hectograph ink suitable for impregnating a fabric typewriter ribbon, the pigments described above can be incorporated on a roller mill in a mixture of equal parts by weight of castor oil and mineral oil, preferably heated to a temperature of 70–100° C. Other oily to wax-like materials suitable as vehicle components for the hectograph inks of the invention include lard oil, Vaseline, oleic acid, lecithin and linseed oil.

The proportions of pigment and vehicle are advantageously chosen to yield a soft paste-like mass on the roller mill. In general, the pigment will constitute 30 to 70% by weight of its combination with the vehicle.

The pigments produced as illustrated in the examples by combining water-soluble acid and basic dyestuffs are water-insoluble and the coatings and images produced with hectograph inks containing them therefore resist smudging on contact with moist objects. However they retain a high degree of solubility in the alcohols used in spirit hectograph solvents, and thus function perfectly in yielding a colored image on a copy when a copy sheet moistened with a spirit hectograph solvent is pressed against a master image made with such inks. Since they are amorphous and their components are chemically combined, they have no tendency to produce copies of varying color due to differential dissolution of color components.

Variations and modifications which will be obvious to those skilled in the art can be made in the foregoing examples without departing from the scope or spirit of the invention.

We claim:

1. The method of preparing a hectograph duplicating ink which comprises mixing at least one water-soluble acid dyestuff with at least one water-soluble basic dyestuff in aqueous solution, recovering and drying the resulting precipitate, and incorporating the latter uniformly in an oily to wax-like duplicating ink vehicle.

2. The method of preparing a hectograph duplicating ink which comprises mixing at least one water-soluble acid dyestuff with at least one water-soluble basic dyestuff in aqueous solution, the respective amounts of acid and basic dyestuffs being approximately stoichiometrically equivalent, recovering and drying the resulting recipitate, and incorporating the latter uniformly in an oily to wax-like duplicating ink vehicle.

3. The method defined in claim 2 wherein the acid and basic dyestuff components are of such shades as to yield, when combined in approximately stoichiometric proportions, a pigment having a black coloration.

4. The method defined in claim 2 wherein at least three dyestuffs are employed, and of the acid and basic components, at least one of the components having more than one dyestuff is made up of water-soluble dyestuffs having different shades, whereby when combined in aqueous solution with a stoichiometrically equivalent amount of the other component, the color of the resulting pigment can be adjusted by adjusting the proportions of the dyestuffs constituting the first named component.

5. The method defined in claim 4 wherein the color of the resulting pigment is black.

6. A hectograph duplicating ink comprising a vehicle of the class consisting of oils and waxes, having uniformly mixed therein a water-soluble pigment which is a salt-like combination of at least one water-soluble basic dyestuff with at least one water-soluble acid dyestuff, said acid and basic dyestuff being present in approximately stoichiometrically equivalent amounts.

7. A hectograph duplicating ink as defined in claim 6 wherein said pigment is black.

8. A water-insoluble black pigment for hectograph ink composed of a combination of 10 parts of Victoria Pure Blue BGO with 7.4 parts of Naphthylamine Black 10BR in salt-like combination.

9. A water-insoluble black pigment for hectograph ink composed of a combination of 14.5 parts of Chrysoidine Y and 29 parts of Crystal Violet with 56.5 parts of Naphthylamine Black 10BR in salt-like combination.

10. A water-insoluble black pigment for hectograph ink composed of a combination of 19 parts of Chrysoidine Y and 26 parts of Crystal Violet with 55 parts of Naphthylamine Black 10BR in salt-like combination.

11. A water-insoluble black pigment for hectograph ink composed of a combination of 51 parts of Chrysoidine Y, 27 parts of Crystal Violet, 20.5 parts of Victoria Blue BS and 1.5 parts of Magneta ABN with 56.5 parts of Naphthylamine Black 10BR and 55 parts of Formyl Violet S4B in salt-like combination.

References Cited by the Examiner

UNITED STATES PATENTS

| | | | |
|---|---|---|---|
| 2,022,678 | 12/1935 | Kritchevsky et al. | 106—22 |
| 2,621,184 | 12/1952 | Locke | 106—22 |
| 2,691,595 | 10/1954 | Drautz et al. | 106—22 |

ALEXANDER H. BRODMERKEL, *Primary Examiner.*

JOHN R. SPECK, MORRIS LIEBMAN, *Examiners.*